United States Patent [19]

Tsay

[11] Patent Number: 5,017,063
[45] Date of Patent: May 21, 1991

[54] UNIVERSAL TOOL REST FOR A MILLING PLANER

[76] Inventor: Han-Tsun Tsay, 33, Lane 85, Tzu Yu I Rd., San Min District, Kao Hsiung, Taiwan

[21] Appl. No.: 479,460

[22] Filed: Feb. 13, 1990

[51] Int. Cl.⁵ .............................................. B23C 1/12
[52] U.S. Cl. ..................................... 409/215; 409/216
[58] Field of Search ............... 409/144, 201, 204, 214, 409/215, 216, 230

[56] References Cited

U.S. PATENT DOCUMENTS

| | | | |
|---|---|---|---|
| 1,720,712 | 7/1929 | Armitage | 409/215 |
| 1,976,107 | 10/1934 | Archea | 409/216 |
| 2,183,166 | 12/1939 | Palumbo | 409/144 |
| 2,307,222 | 1/1943 | Johnson | 409/215 |

FOREIGN PATENT DOCUMENTS 544519  2/1977  U.S.S.R. .................... 409/215

*Primary Examiner*—William Briggs
*Attorney, Agent, or Firm*—Morton J. Rosenberg; David I. Klein

[57] ABSTRACT

This invention relates to a universal tool rest for a milling planer and in particular to one mainly including two housings which may be rotated with respect to each other and three transmission shafts whereby the milling cutter thereon may be rotated in position with the tool rest so as to permit cutting of an inclined surface.

1 Claim, 7 Drawing Sheets

UNIVERSAL TOOL REST FOR A MILLING PLANER

BACKGROUND OF THE INVENTION

It is found that the prior art tool rests for milling planers can only be moved either horizontally or vertically. That is, it is impossible to adjust such tool rests to cut inclined surfaces and so the workpiece must be manually rotated to adapt to the tool rest thereby causing user inconvenience and lost labor time.

It is, therefore, an object of the present invention to provide a universal tool rest for a milling planer which can be adjusted in angular position so as to permit cutting of an inclined surface as required.

SUMMARY OF THE INVENTION

This invention relates to a universal to a universal tool rest for a milling planer.

It is the primary object of the present invention to provide a universal tool rest for a milling planer which can be adjusted in any angular position.

It is another object of the present invention to provide a universal tool rest for a milling planer which is simple in construction.

It is still another object of the present invention to provide a universal tool rest for a milling planer which is easy to operate.

It is a further object of the present invention to provide a universal tool rest for a milling planer which is of high efficiency.

It is still a further object of the present invention to provide a universal tool rest for a milling planer which is economic to produce.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
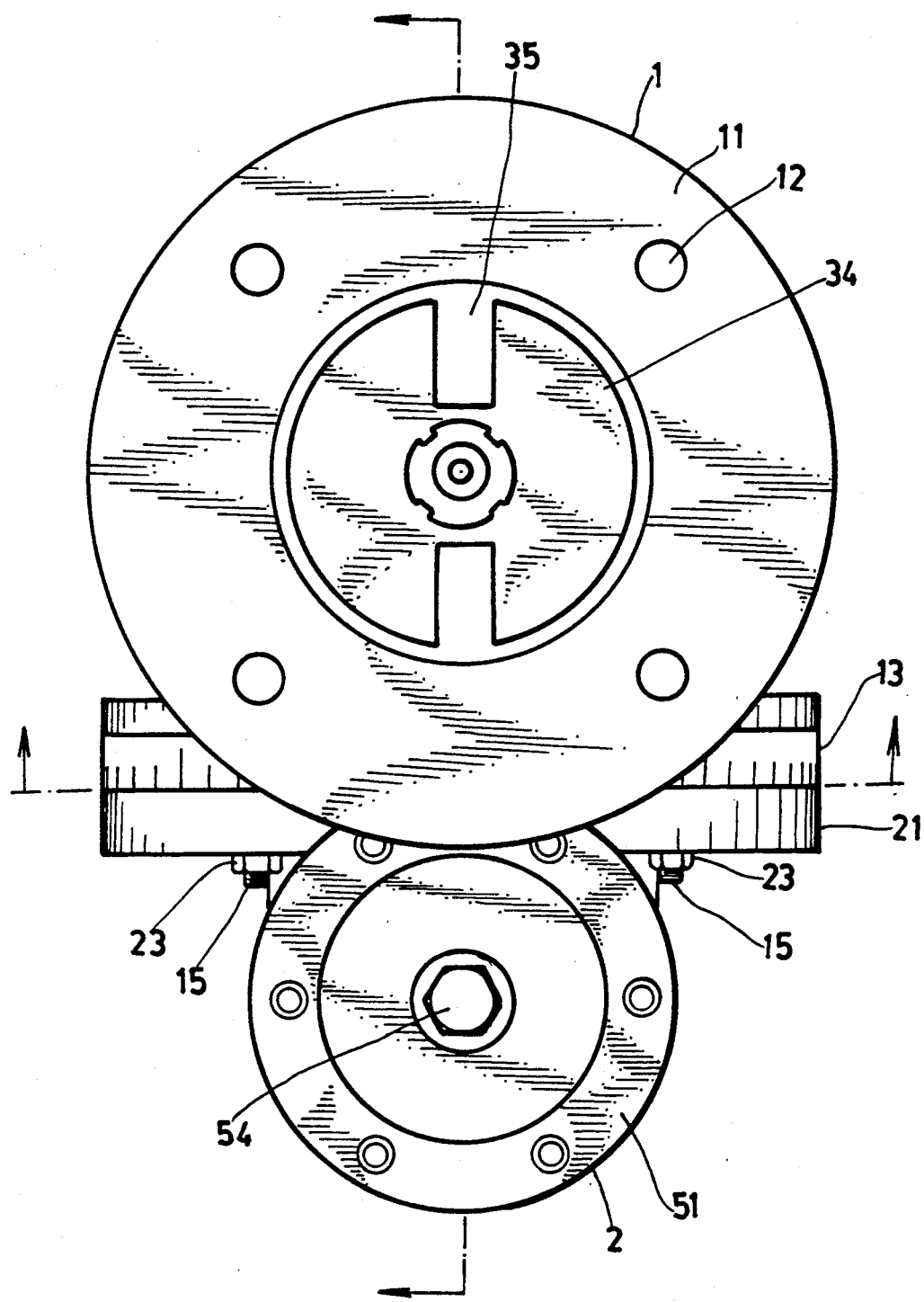
FIG. 1 is a top view of a universal tool rest for a milling planer according to the present invention.
Figure 2:
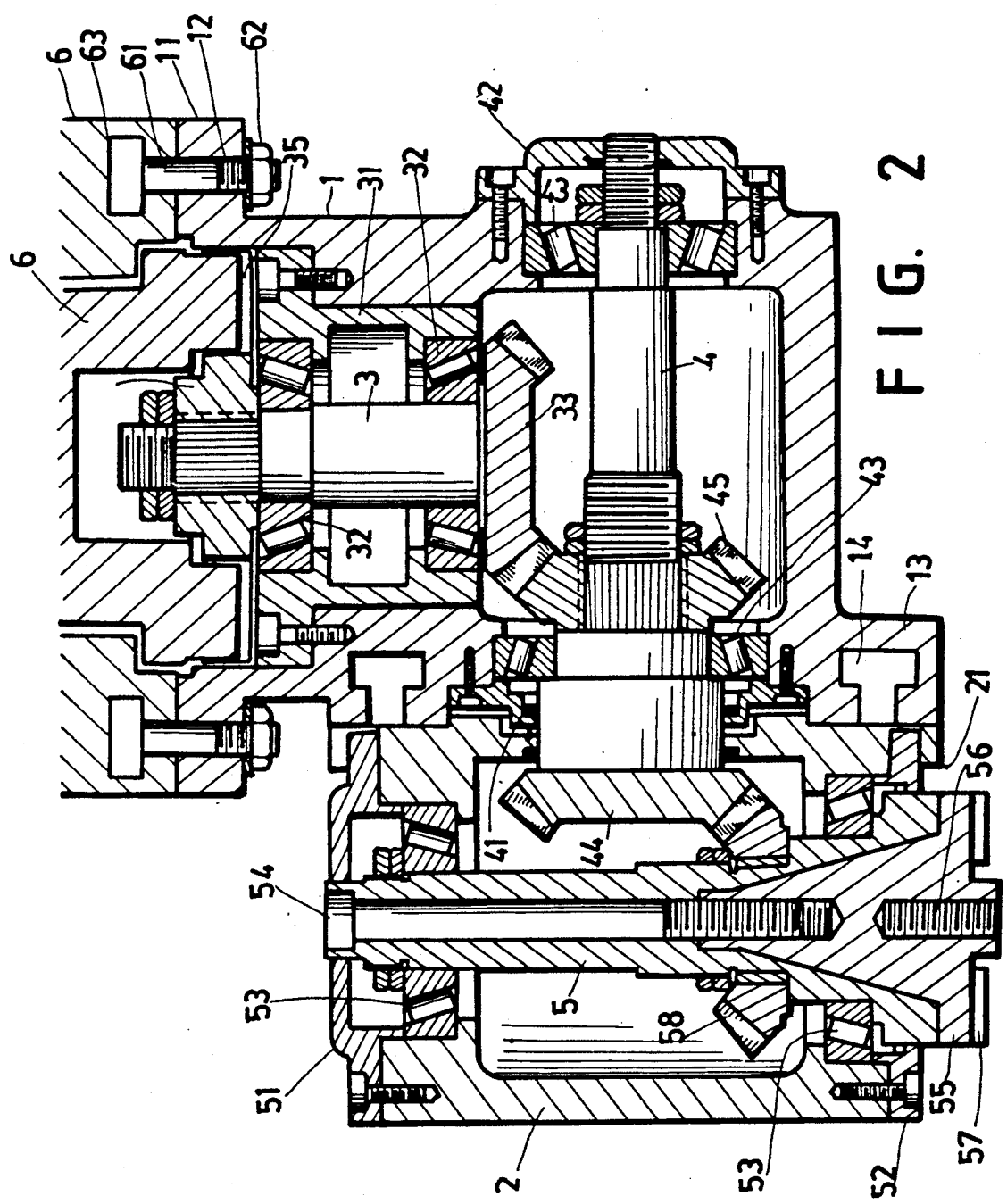
FIG. 2 is a sectional view taken along line A—A of FIG. 1.

With reference to the drawings and in particular to FIGS. 1 and 2 thereof, the universal tool rest for a milling planer according to the present invention mainly comprises a large housing 1, a small housing 2, a first transmission shaft 3, a second transmission shaft 4 and a third transmission shaft 5.

Figure 3A:
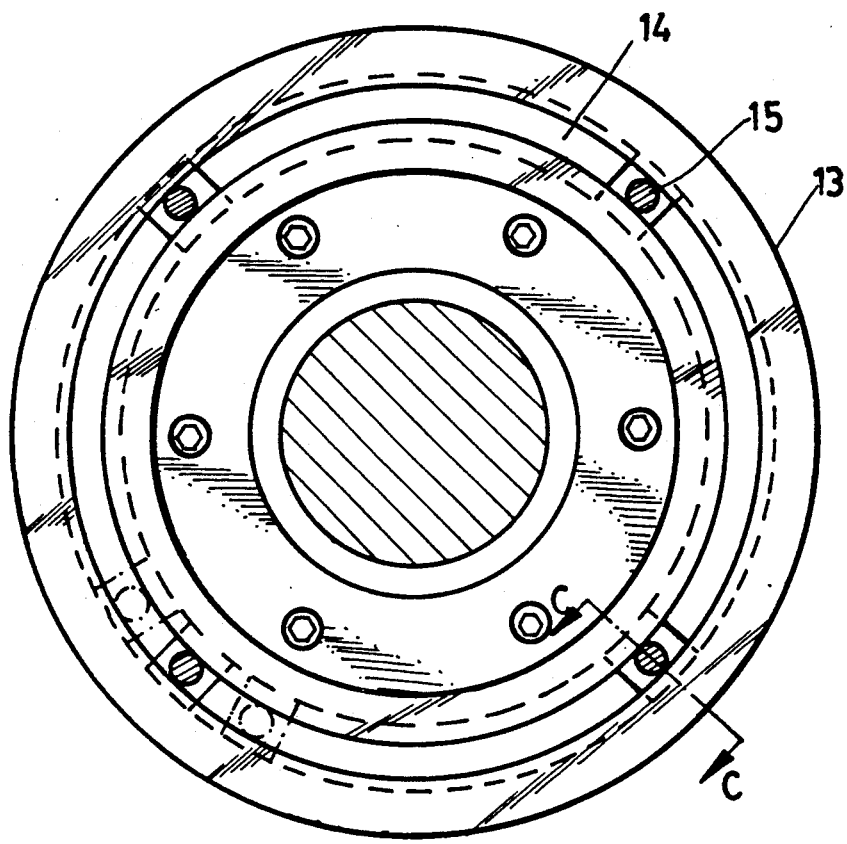
FIG. 3A is a sectional view taken along line B—B of FIG. 1.
Figure 3B:
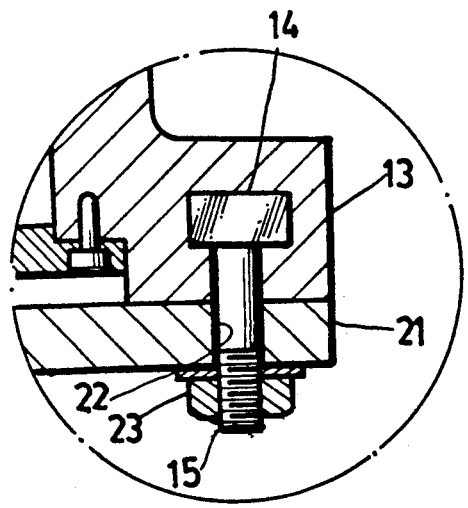
FIG. 3B is a sectional view taken along the sectional line C—C of FIG. 3A.
Figure 4:
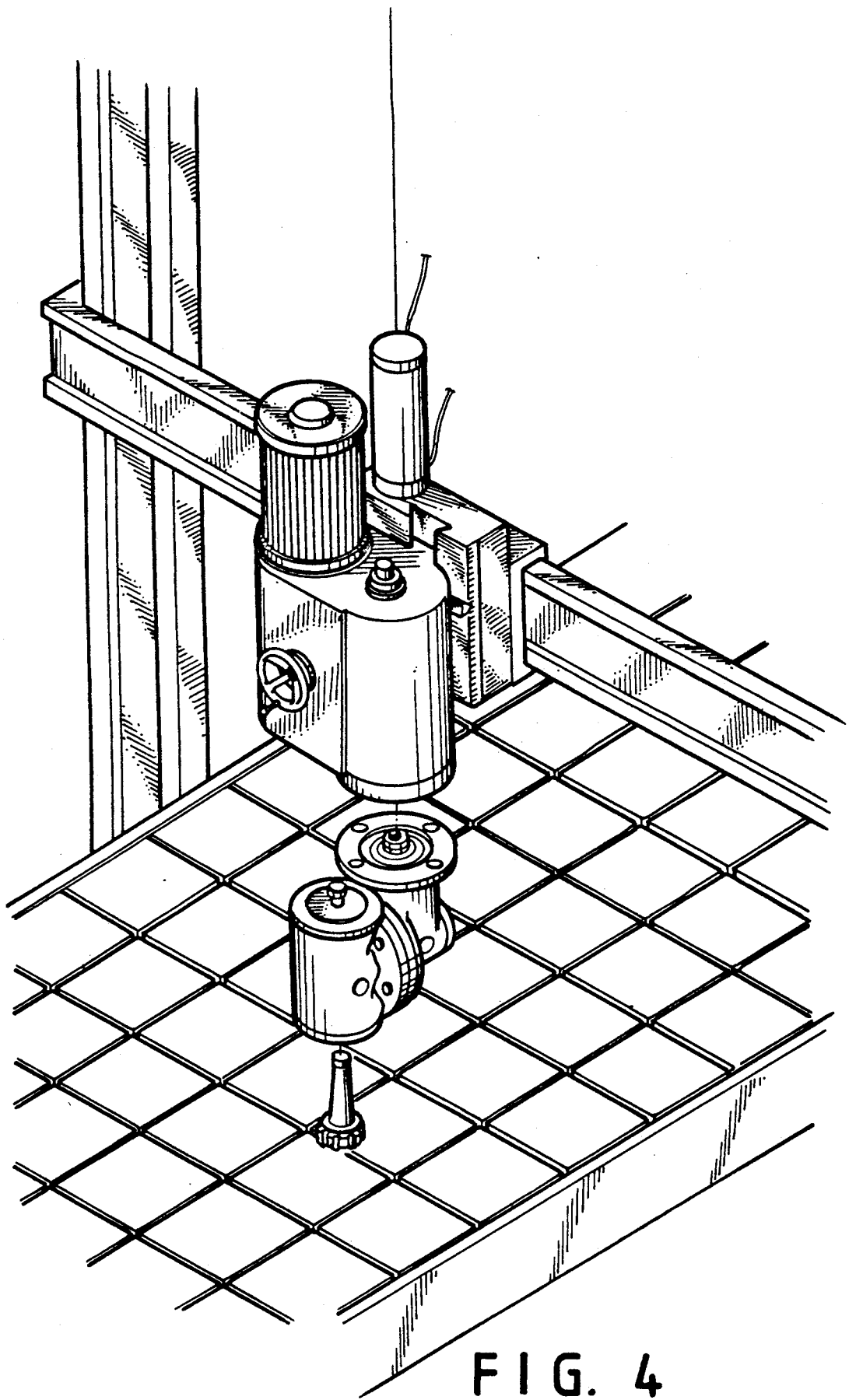
FIG. 4 show how the universal tool rest is mounted on a milling planer.
Figure 5:
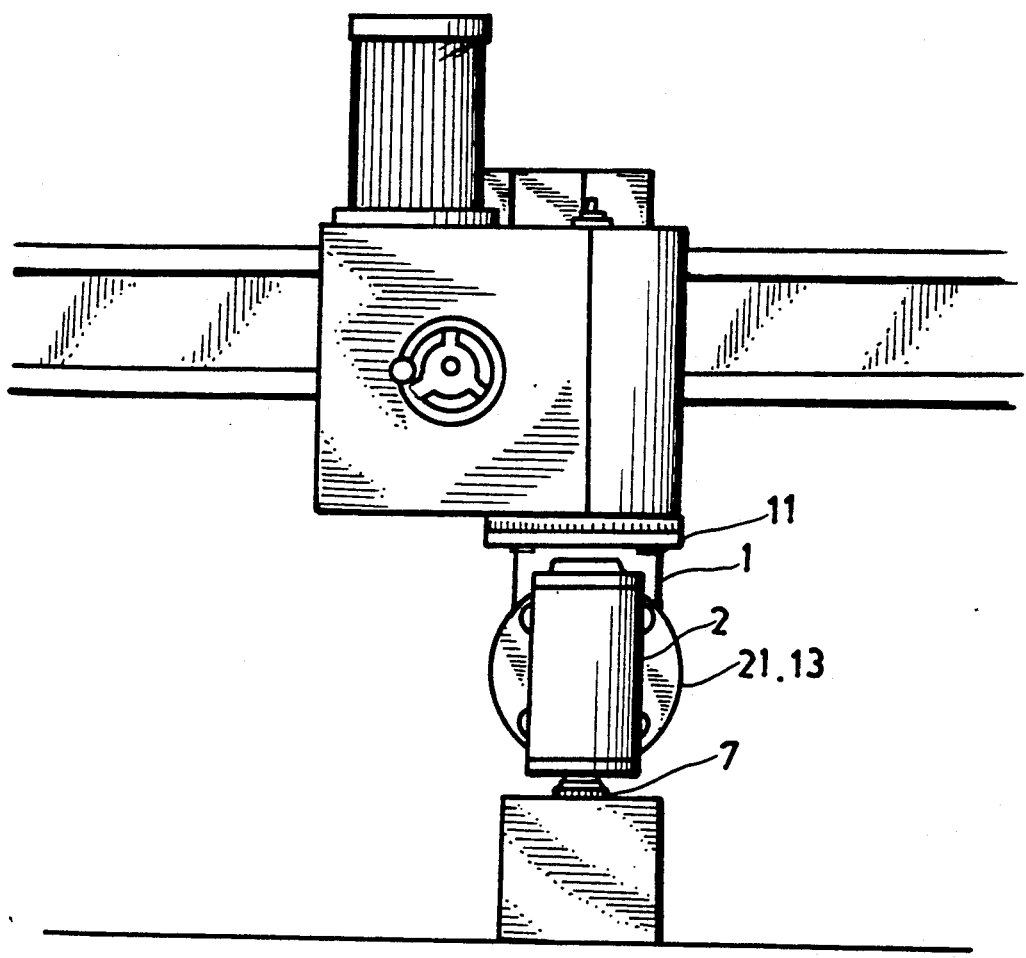
FIG. 5 is a front view showing an application of the universal tool rest.
Figure 6:
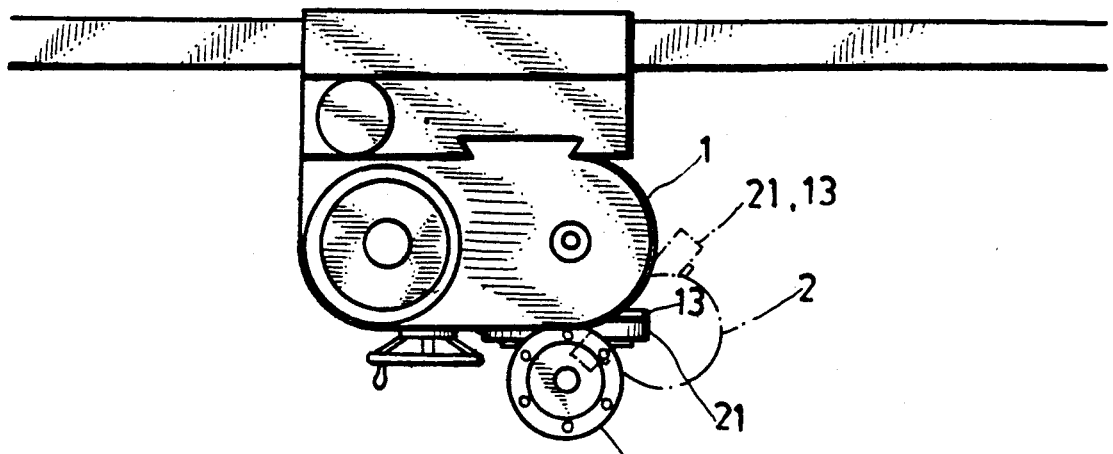
FIG. 6 is a top view of FIG. 5.
Figure 7:
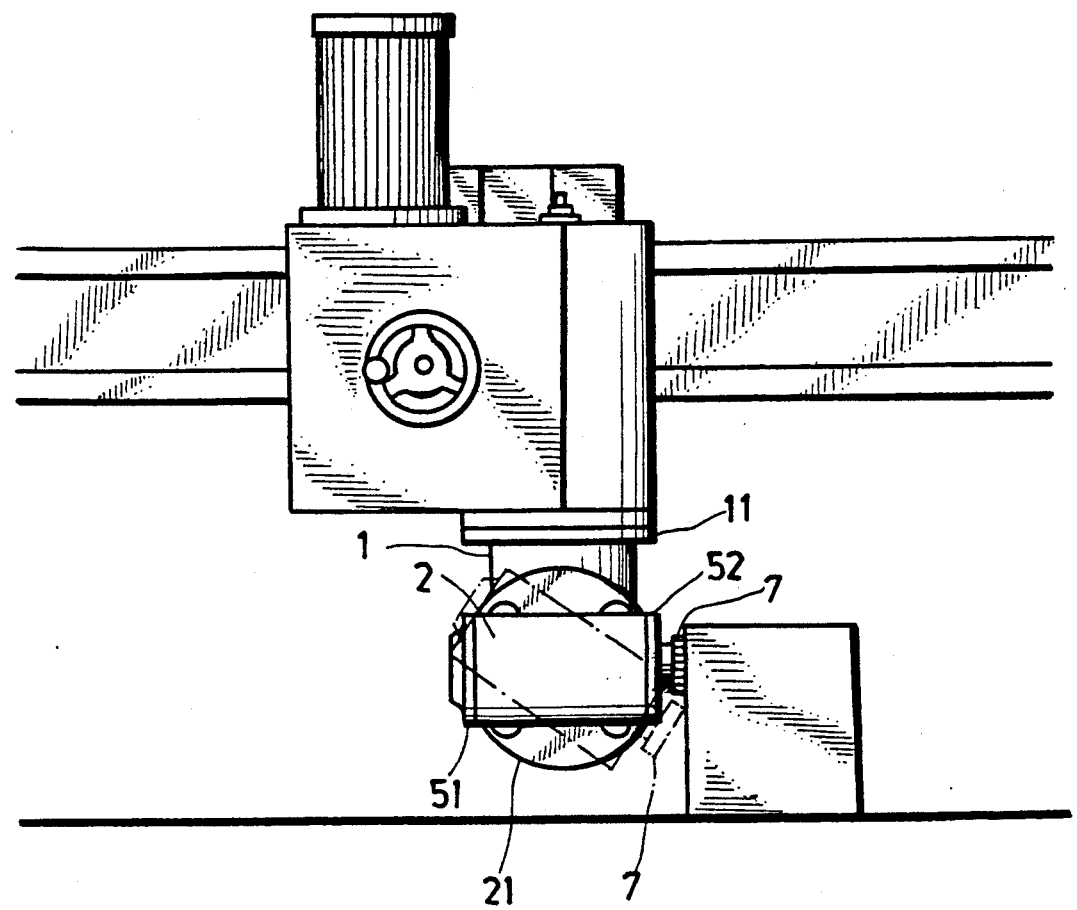
FIG. 7 is a front view showing another application of the universal tool rest.
Figure 8:
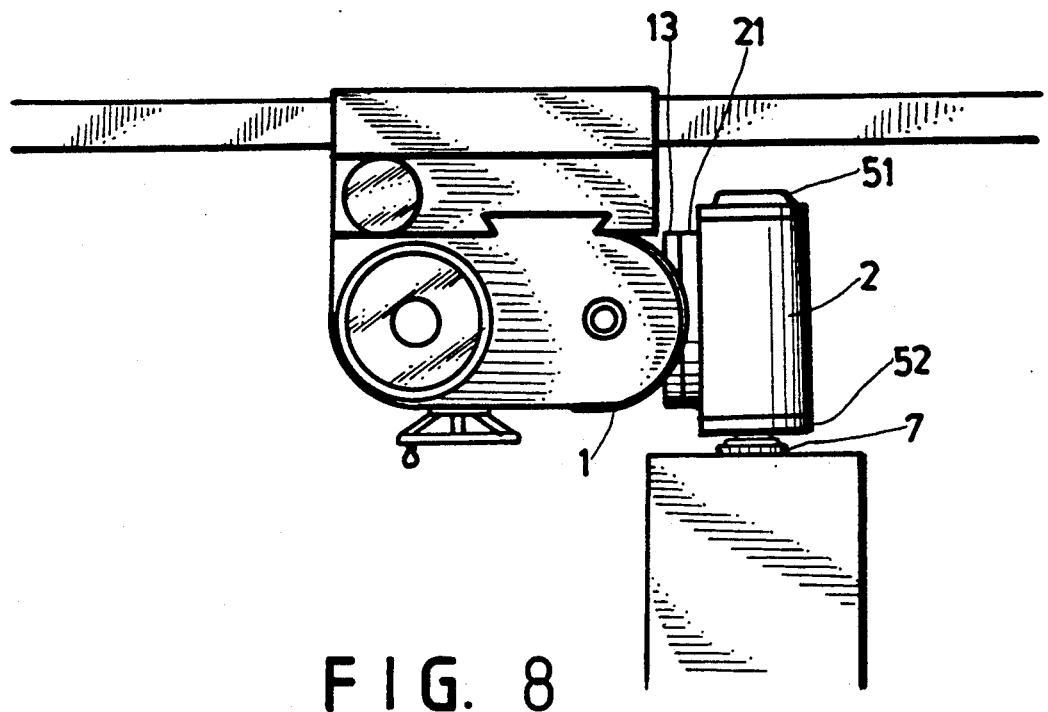
FIG. 8 is a top view of FIG. 7.
Figure 9:
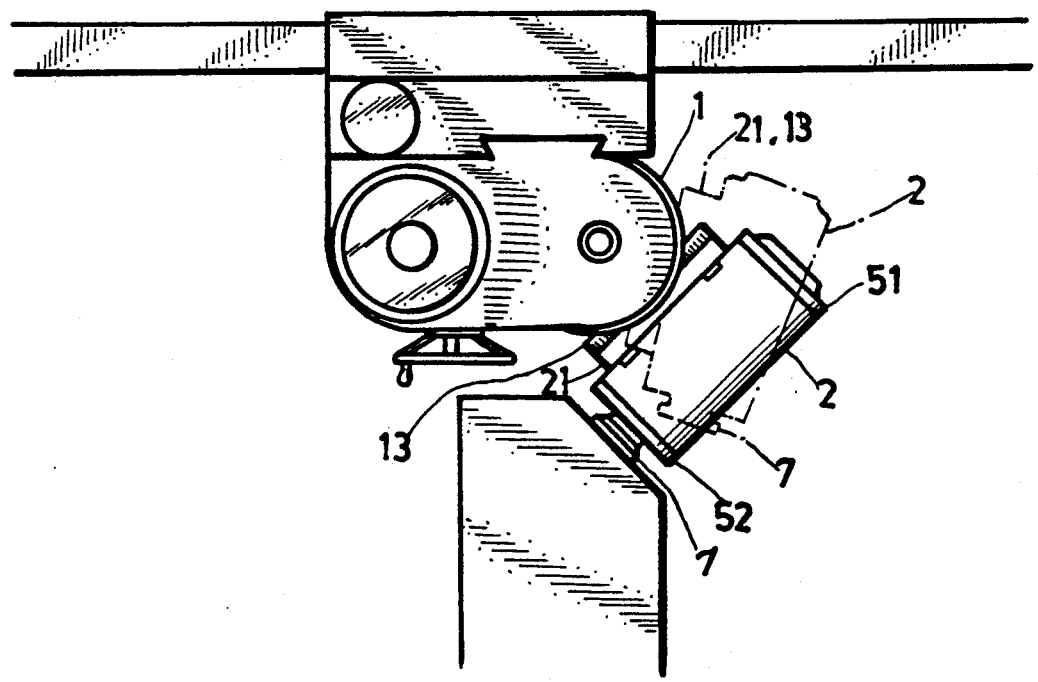
FIG. 9 is a top view showing a further application of the universal tool rest.

The large housing 1 is provided at the upper end with a connection disc 11 having four holes 12 for the passage of bolts 61 which, in association with nuts 62, may fix the housing 1 on the lower end of a driving stand 6 of the milling planer (see FIG. 4). Since the head of the bolt 61 is received in the T-shaped annular groove, the housing 1 may be adjusted in position as required. Further, the front side of the housing 1 has a connection disc 13 provided with a T-shaped annular groove 14 engage with four bolts 15 (see FIG. 3). On the connection disc 13 there is an angle calibration ring 16.

The small housing 2 has a connection disc 21 at the rear side which also has four holes 22 for the passage of the bolts 15 which in association with the nuts 23 may fix the small housing 2 on the large housing 1. Moreover, the small housing 2 may be adjusted in position as required.

The transmission shaft 3 is vertically mounted into the housing 1 via a sleeve 31 and two bearings 32, which has a bevel gear 33 at the lower end and a transmission disc 34 at the upper end. The transmission disc 34 has two opposite slots 35 for engaging the driving stand 6 thereby connecting the driving stand 6 with the transmission shaft 3.

The transmission shaft 4 is horizontally mounted into the lower part of the housing 1 by means of the front cover 41, the rear cover 42 and the bearings 43. The front end of the transmission shaft 4 extends into the small housing 2 and has a first bevel gear 44 at the front end and a second bevel gear 45 at the intermediate portion. The bevel gear 45 is engaged with the bevel gear 33 of the transmission 3 so that the transmission shaft 3 may drive the transmission shaft 4 to rotate.

The transmission shaft 5 is vertically mounted into the small housing 2 via the upper cover 51, the lower cover 52 and the bearings 53. A tool post 55 is fitted into the lower end of the housing 2 by means of a bolt 54. The tool post 55 has at the lower end a threaded hole 56 and an engaging member 57 by the means of which a milling cutter 7 may be mounted thereon by a bolt. In addition, the transmission shaft 5 has a bevel gear 58 for engaging the bevel gear 44 of the transmission shaft 4 such that the transmission shaft 3 may drive the milling cutter 7 via the transmission shafts 4 and 5.

FIGS. 5, 6, 7, 8 and 9 show how the universal tool rest works. As illustrated, the housings 1 and 2 may be randomly adjusted in angular position simply by loosening the nuts 62 and 23 hence rendering the universal tool rest to work at any angle.

Although the present invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. A universal tool rest for a milling planer comprising:
    a first housing provided at the upper end with a connection disc rotatably engaging a lower end of a driving stand of the milling planer and at the front side with a second connection disc having a T-shaped annular groove;
    a second housing provided at the rear side with a connection disc engaged with the second connection disc of said first housing so that said second housing may be adjusted in position as required;

a first transmission shaft vertically mounted into said first housing via a sleeve and two bearings and having a bevel gear at the lower end and a transmission disc at the upper end, said transmission disc having two opposite slots for engaging the driving stand thereby connecting the driving stand with the transmission shaft;

a second transmission shaft horizontally mounted into the lower part of the housing by means of a front cover, a rear cover and two bearings and having a front end extending into said second housing and a first bevel gear at the front end and a second bevel gear at the intermediate portion, said second bevel gear being engaged with the bevel gear of said first transmission shaft thereby enabling said transmission gear to drive said second transmission shaft;

a third transmission shaft vertically mounted into said second housing via an upper cover, a lower cover and two bearings, a tool post being fitted into a lower end of said second housing by means of a bolt and having at the lower end a threaded hole and an engaging member by means of which a milling cutter may be mounted thereon by a bolt, said third transmission shaft having a bevel gear for engaging with the first bevel gear of said second transmission shaft such that said first transmission shaft may drive said milling cutter via said first and second transmission shafts;

whereby said milling cutter may be rotated by the driving stand via said first, second and third transmission shafts and can be randomly rotated as required.

* * * * *